US012744260B2

(12) United States Patent
Bernhard et al.

(10) Patent No.: US 12,744,260 B2
(45) Date of Patent: Sep. 22, 2026

(54) METHOD FOR CYCLING LITHIUM ION BATTERIES HAVING ANODES CONTAINING PRELITHIATED SILICON

(71) Applicant: Wacker Chemie AG, Munich (DE)

(72) Inventors: Rebecca Bernhard, Munich (DE); Markus Ege, Munich (DE); Stefan Haufe, Neubiberg (DE)

(73) Assignee: Wacker Chemie AG, Munich (DE)

( * ) Notice: Subject to any disclaimer, the term of this patent is extended or adjusted under 35 U.S.C. 154(b) by 361 days.

(21) Appl. No.: 17/613,074

(22) PCT Filed: May 21, 2019

(86) PCT No.: PCT/EP2019/063120

§ 371 (c)(1),
(2) Date: Nov. 21, 2021

(87) PCT Pub. No.: WO2020/233799

PCT Pub. Date: Nov. 26, 2020

(65) Prior Publication Data

US 2022/0263145 A1 Aug. 18, 2022

(51) Int. Cl.

| | |
|---|---|
| ***H01M 10/44*** | (2006.01) |
| ***H01M 4/02*** | (2006.01) |
| ***H01M 4/134*** | (2010.01) |
| ***H01M 4/1395*** | (2010.01) |
| ***H01M 4/38*** | (2006.01) |
| ***H01M 10/0525*** | (2010.01) |

(52) U.S. Cl.

CPC ......... *H01M 10/446* (2013.01); *H01M 4/134* (2013.01); *H01M 4/1395* (2013.01); *H01M 4/386* (2013.01); *H01M 10/0525* (2013.01); *H01M 2004/027* (2013.01)

(58) Field of Classification Search

CPC .... H01M 4/134; H01M 4/1395; H01M 4/386; H01M 10/0525; H01M 10/446
USPC .................................. 429/50, 218.1, 231.95
See application file for complete search history.

(56) References Cited

U.S. PATENT DOCUMENTS

| | | | | |
|---|---|---|---|---|
| 6,383,686 | B1 * | 5/2002 | Umeno | H01M 10/44 429/218.1 |
| 8,124,279 | B2 | 2/2012 | Petrat et al. | |
| 10,115,998 | B2 | 10/2018 | Hayner et al. | |
| 2005/0214646 | A1 | 9/2005 | Kubota | |
| 2014/0212755 | A1 | 7/2014 | Wu et al. | |
| 2014/0234722 | A1 * | 8/2014 | Kyotani | B82Y 30/00 427/122 |
| 2015/0364795 | A1 | 12/2015 | Stefan et al. | |
| 2016/0141596 | A1 | 5/2016 | Uhm et al. | |
| 2018/0212234 | A1 * | 7/2018 | Haufe | H01M 4/364 |
| 2018/0269524 | A1 * | 9/2018 | Haufe | H01M 4/386 |
| 2018/0358616 | A1 | 12/2018 | Kren et al. | |
| 2019/0088922 | A1 | 3/2019 | Zhamu et al. | |
| 2019/0181440 | A1 * | 6/2019 | Park | H01M 4/364 |
| 2019/0237759 | A1 * | 8/2019 | Bräunling | H01M 10/052 |

FOREIGN PATENT DOCUMENTS

| | | | | |
|---|---|---|---|---|
| CN | 109786670 | A * | 5/2019 | |
| DE | 102013014627 | A1 | 3/2015 | |
| DE | 102015217809 | A1 | 3/2017 | |
| DE | 102016203352 | A1 | 9/2017 | |
| JP | 4911835 | B2 | 4/2012 | |
| JP | 2020507193 | A | 3/2020 | |
| WO | 2014/202529 | A1 | 12/2014 | |
| WO | 2015/117838 | A1 | 8/2015 | |
| WO | 2016089811 | A1 | 6/2016 | |
| WO | WO-2017025346 | A1 * | 2/2017 | C01B 33/02 |
| WO | WO-2017045950 | A1 * | 3/2017 | C23C 16/06 |
| WO | 2017123443 | A1 | 7/2017 | |
| WO | 2017/140642 | A1 | 8/2017 | |
| WO | 2017/214885 | A1 | 12/2017 | |
| WO | WO-2018024317 | A1 * | 2/2018 | H01M 10/0525 |
| WO | WO-2018065046 | A1 * | 4/2018 | H01M 10/052 |
| WO | 2018/082880 | A1 | 5/2018 | |
| WO | 2018/112801 | A1 | 6/2018 | |
| WO | 2018/145732 | A1 | 8/2018 | |
| WO | 2019088139 | A1 | 5/2019 | |

OTHER PUBLICATIONS

"Pre-." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1280156. (Year: 2010).*

Tang et al., J. Electrochem. Soc. 2013, 160, 1232-1240.

Zeilinger et al., Chem. Mater., 2013, 25, 4113-4121.

Nian Liu et al.: "Prelithiated Silicon Nanowires as an Anode for Lithium Ion Batteries", ACS Nano, vol. 5, pp. 6487-6493.

* cited by examiner

*Primary Examiner* — Sean P Cullen

(57) ABSTRACT

A lithium-ion battery and method for cycling lithium-ion batteries. The method includes providing a lithium-ion battery comprising a cathode, an anode, a separator and an electrolyte. The anode contains pre-lithiated silicon having a degree of pre-lithiation $\alpha 1$ of from 5 to 50% and the anode material is only partially lithiated during full charging of the lithium-ion battery by the lithiation capacity of silicon being utilized to a degree of lithiation $\alpha 2$ of from 5 to 50% by the partial lithiation of the anode material during full charging of the lithium ion battery. The total degree of lithiation $\alpha$ of the silicon is from 10 to 75%, the total degree of lithiation $\alpha$ is the sum of the degree of pre-lithiation $\alpha 1$ and the degree of lithiation $\alpha 2$, where the figures in % are based on the maximum lithiation capacity of silicon.

16 Claims, No Drawings

METHOD FOR CYCLING LITHIUM ION BATTERIES HAVING ANODES CONTAINING PRELITHIATED SILICON

CROSS-REFERENCE TO RELATED APPLICATIONS

This application is a U.S. National Phase application of PCT Application No. PCT/EP2019/063120 filed on May 21, 2019 the disclosure of which is incorporated by reference herein in its entirety.

The invention relates to lithium ion batteries having a silicon-containing anode.

Rechargeable lithium ion batteries are at present the most practically useful electrochemical energy stores having the highest gravimetric energy densities of, for example, up to 250 Wh/kg. Graphitic carbon is widespread as active material for the negative electrode (anode). However, the electrochemical capacity of graphite is limited to at most 372 mAh/g. Graphite-based anodes of high-energy lithium ion batteries have volumetric electrode capacities of at most 650 $mAh/cm^3$ at the present time. Silicon is recommended as alternative anode active material having a higher electrochemical capacity. Combined with lithium, silicon forms binary electrochemically active alloys of the formula $Li_{4.4}Si$, which corresponds to a specific capacity of 4200 mAh per gram of silicon. A disadvantage is that silicon experiences a volume change of up to 300% on incorporation and release of lithium. This leads over the course of a number of charging and discharging cycles to a continuous, generally irreversible loss of capacity of the battery, also referred to as fading. A further problem is the reactivity of silicon. Thus, passivating layers are formed on the silicon surface (solid electrolyte interface; SEI) are formed on contact with the electrolyte, leading to immobilization of lithium, which reduces the capacity of the battery. An SEI is formed on first-time charging of silicon-containing lithium ion batteries, which brings about an initial loss in capacity. During further operation of the lithium ion batteries, volume changes of the silicon particles occur during each charging or discharging cycle, as a result of which fresh silicon surfaces are exposed and these in turn react with constituents of the electrolyte to form further SEI. This leads to immobilization of further lithium and thus to a continuous, irreversible loss in capacity.

Anodes containing silicon particles are known, for example, from EP1730800 or WO2014/202529. Such anodes usually contain binders and frequently graphite or conductive additives as further constituents. To reduce continuous, irreversible losses in capacity of lithium ion batteries, various approaches have been described. For example, WO 2017/025346 recommends operating lithium ion batteries so that the silicon of the anode is only partially lithiated, i.e. the capacity of the silicon for lithium is not fully exhausted, in the fully charged state of the battery. US 2005/0214646 charges batteries in such a way that molar lithium/silicon ratios of not more than 4.0 are present in the anode material. Li/Si ratios of 3.5 and above are specifically described. JP 4911835 describes Li/Si ratios for the anode material of charged lithium ion batteries in the range from 2.3 to 4.0.

The use of prelithiated silicon as anode active material for lithium ion batteries is known from various documents. The term prelithium generally refers to the measure of introducing lithium into the anode active material before operation of the lithium ion battery; this lithium is not or at least incompletely extracted from the anode during discharging of the battery. Prelithiation of silicon active material can, for example, be effected by grinding elemental lithium with silicon in a ball mill or in the melt, with silicide phases being able to be formed, as described by Tang et al., J. Electrochem. Soc. 2013, 160, 1232-1240, or Zeilinger et al., Chem. Mater., 2013, 25, 4113-4121. DE 102013014627 describes prelithiation processes in which Si particles are reacted with inorganic lithium compounds such as lithium oxides or with organic lithium compounds such as lithium salts of carboxylic acids. In US2014212755, inorganic lithium compounds such as oxides, halides or sulfides are introduced into the cathode. The prelithiation of the anode active material then occurs during the course of formation of the battery. An analogous approach is also described in U.S. Ser. No. 10/115,998. DE 102015217809 describes lithiating anode active materials by means of chemical vapor deposition (CVD) using lithiated precursors, for example lithiated alkynes or lithiated aromatic hydrocarbons, and subsequently coating them with carbon. WO 2017/214885 also describes lithium ion batteries having a prelithiated anode. According to WO 2018/112801, lithium peroxide is introduced as chemically reactive sacrificial salt into the cathode or the electrolyte and this is decomposed during formation of the battery with prelithiation of the anode. In US 2015/0364795, too, use is made of electrolyte containing lithium salts such as lithium azides, lithium acetates, lithium amines or lithium acetylenes. Here, prelithiation of the anode active material likewise occurs during formation of the battery. WO 2016/089811 recommends various metals, in particular silicon alloys, as anode active materials. The prelithiation of the anode active materials occurred in the half cell against lithium. US 2016/141596 prelithiates anode active material by applying elemental lithium in the form of a thin lithium foil to the current collector. WO 2017/123443 A1 uses stabilized lithium powder (SLMP®; FMC Lithium Energy) for prelithiation of anodes. Examples of SLMPs® are lithium metal particles which have been coated with lithium salt to effect passivation. Compression of such anodes breaks open the passivation layer of the SLMP®, so that the lithium particles can participate in the redox process in the cell and prelithiate the anode active material. However, SLMP® is very expensive and sensitive to atmospheric moisture and thus not compatible with water-based processing of the anode active material to produce the electrode. The lithium ion batteries of US 2018/0358616 also contain anodes comprising prelithiated silicon. In US 2018/0358616, cycling of the batteries occurs with complete utilization of the specific anode capacity of the silicon-containing anodes. Silicon particles having average diameters of from 30 to 500 nm are mentioned here as anode active materials. The amount of mobile lithium (sum of lithium from the cathode and lithium introduced by prelithiation) which is available for incorporation and release processes was fixed at from 1.1 to 2.0 times the amount of lithium in the anode. The anode coatings of US 2018/0358616 contain 20% by weight of silicon. However, capacity decreases during cycling of the batteries occur to an increased extent in the case of anodes having relatively large proportions of silicon.

In the light of this background, it was an object of the invention to provide lithium ion batteries which have a silicon-containing anode and achieve a high reversible capacity and in particular a high cycling stability. The lithium ion batteries should also preferably have very high volumetric capacities.

The object has surprisingly been achieved by lithium ion batteries whose anode contains silicon which had been prelithiated and additionally had been only partially lithiated in the fully charged state of the lithium ion battery. Here, it was found to be important to lithiate the silicon only to a well-defined extent.

The invention provides lithium ion batteries comprising cathode, anode, separator and electrolyte, characterized in that the anode contains prelithiated silicon and the material of the anode (anode material) of the fully charged lithium ion battery is only partially lithiated, where the total degree of lithiation α of the silicon is from 10 to 75%, based on the maximum lithiation capacity of silicon.

The invention further provides a method for charging lithium ion batteries comprising cathode, anode, separator and electrolyte, characterized in that the anode contains prelithiated silicon and the material of the anode (anode material) is only partially lithiated during full charging of the lithium ion battery, where the total degree of lithiation α of the silicon is from 10 to 75%, based on the maximum lithiation capacity of silicon.

Lithiation of silicon refers generally to the introduction of lithium into silicon. Here, silicon-lithium alloys, also known as lithium silicides, are generally formed.

Prelithiation of silicon refers generally to lithiation of silicon before or during formation of the lithium ion battery, where the amount of lithium introduced in this way into the silicon remains completely or partially in the silicon during cycling of the lithium ion battery. In other words, prelithiation refers generally to the lithiation of silicon before the lithium ion battery is cycled. Lithium introduced into the silicon by prelithiation is thus generally not or at least not completely reversible during cycling of the battery.

Cycling refers generally to a full cycle of charging and discharging of the lithium ion battery. Within a full cycle, the battery generally attains the state of its maximum charge during charging and attains the state of its maximum discharge during discharging. In a charging/discharging cycle of the battery, the maximum storage capacity thereof for electric power is, as is known, utilized once. The maximum charging and discharging of the battery can, for example, be set via its upper or lower switch-off voltage. During cycling, the battery is utilized as normal as storage medium for electric power.

The term formation refers, as is generally known, to measures by means of which the lithium ion battery is brought into its ready-to-use form as storage medium for electric power.

Formation can, for example, encompass charging and discharging of the battery one or more times, resulting in chemical modification of battery constituents, in particular prelithiation of the anode active material or the formation of an initial solid electrolyte interface (SEI) of the anode active material, or can also comprise ageing at an optionally elevated temperature, by means of which the battery is brought to its ready-to-use state as storage medium for electric power. A formed lithium ion battery thus generally differs structurally from a battery which has not been formed. Formation is as usual carried out at a time before cycling. Formation does not comprise cycling, as is known.

Formation and cycling generally also differ in that a greater loss of mobile silicon or greater losses of capacity of the lithium ion battery occur during formation than during cycling. During the course of formation of the lithium ion battery, capacity losses of, for example, ≥1% or ≥5% occur. In two successive cycling steps, especially in two successive cycling steps within the first ten cycling steps after formation, losses in capacity of preferably ≤1%, particularly preferably ≤0.5% and even more preferably ≤0.1%, occur. The volumetric capacity of the anode coatings can be determined by dividing the delithiation capacity per unit area (3, as described in the examples, by the thickness of the anode coating. The thickness of the anode coating can be determined using the Mitutoyo digital gauge (1 μm to 12.7 mm) with fine measurement table.

The term lithiation capacity generally refers to the maximum amount of lithium which can be taken up by the anode active material. This amount can in the case of silicon generally be expressed by the formula $Li_{4.4}Si$. The maximum specific capacity of silicon for lithium, i.e. the maximum lithiation capacity of silicon, generally corresponds to 4200 mAh per gram of silicon.

The total degree of lithiation α generally refers to the proportion of the lithiation capacity of silicon which is maximally occupied during cycling of the lithium ion battery. The total degree of lithiation α thus generally comprises the proportion of the lithiation capacity of silicon which is occupied by prelithiation of silicon (degree of prelithiation α1) and also the proportion of the lithiation capacity of silicon which is occupied as a result of the partial lithiation of the anode material during charging, in particular complete charging, of the lithium ion battery (degree of lithiation α2). The total degree of lithiation α is generally given by the sum of the degree of prelithiation α1 and the degree of lithiation α2. The total degree of lithiation α preferably relates to the fully charged lithium ion battery.

The total degree of lithiation α of silicon is from 10 to 75%, preferably from 20 to 65%, particularly preferably from 25 to 55% and most preferably from 30 to 50%, of the maximum lithiation capacity of silicon.

In the partially lithiated anode material of the fully charged lithium ion battery, the ratio of lithium atoms to silicon atoms preferably corresponds to the formula $Li_{0.45}Si$ to $Li_{3.30}Si$, more preferably $Li_{0.90}Si$ to $Li_{2.90}Si$, particularly preferably $Li_{1.10}Si$ to $Li_{2.40}Si$ and most preferably $Li_{1.30}Si$ to $Li_{2.20}Si$. These figures can be determined with the aid of the degree of lithiation α and the formula $Li_{4.4}Si$.

In the partially lithiated anode material of the fully charged lithium ion battery, the capacity of silicon is utilized to an extent of preferably from 400 to 3200 mAh per gram of silicon, more preferably from 850 to 2700 mAh per gram of silicon, particularly preferably from 1000 to 2300 mAh per gram of silicon and most preferably from 1250 to 2100 mAh per gram of silicon. These figures are derived from the degree of lithiation α and the maximum lithiation capacity of silicon (4200 mAh per gram of silicon).

From the lithiation capacity of silicon which is maximally utilized according to the invention in the lithium ion battery, in particular of the total degree of lithiation α, preferably from 50 to 90%, particularly preferably from 60 to 85% and most preferably from 70 to 80%, are utilized reversibly or for cycling or for charging and/or discharging of the lithium ion battery.

The degree of prelithiation α1 of silicon is preferably from 5 to 50%, more preferably from 7 to 46%, particularly preferably from 8 to 30% or from 10 to 44% and most preferably from 10 to 20% or alternatively from 20 to 40%, of the lithiation capacity of silicon. The degree of prelithiation α1 generally refers to the proportion of the lithiation capacity of silicon which is occupied as a result of prelithiation. A method for determining the degree of prelithiation α1 is described below in the examples.

The amount of lithium introduced into the silicon by prelithiation preferably corresponds to the formula $Li_{0.20}Si$ to $Li_{2.20}Si$, more preferably $Li_{0.25}Si$ to $Li_{1.80}Si$, particularly preferably $Li_{0.35}Si$ to $Li_{1.30}Si$ and most preferably $Li_{0.45}Si$ to $Li_{0.90}Si$. These figures can be determined with the aid of degree of prelithiation $\alpha 1$ and the formula $Li_{4.4}Si$.

The amount of lithium introduced into the silicon by prelithiation corresponds to a lithiation capacity of preferably from 200 to 2100 mAh per gram of silicon, more preferably from 250 to 1700 mAh per gram of silicon, particularly preferably from 340 to 1300 mAh per gram of silicon and most preferably from 400 to 850 mAh per gram of silicon. These figures are derived from the degree of prelithiation $\alpha 1$ and the maximum lithiation capacity of silicon (4200 mAh per gram of silicon).

The prelithiation can, for example, be carried out by treating silicon with one or more prelithiating agents. Preferred prelithiating agents are lithium compounds. The lithium compounds can generally be organic or inorganic compounds. Examples of inorganic lithium compounds are lithium hydroxide, lithium oxides, lithium peroxide, lithium nitrides, lithium azides, lithium sulfides, lithium halides or lithium carbonate. Examples of organic lithium compounds are lithium salts of carboxylic acids, in particular lithium acetate, lithium benzoate, lithium citrate, lithium tartrate, lithium amides such as lithium dimethylamide, lithium alkoxides, in particular lithium methoxide, lithium acetylacetonate, lithium acetylides, alkyllithium or aryllithium, e.g. butyllithium or biphenyllithium, or lithium-silyl compounds such as bis(trimethylsilyl)lithium.

Suitable lithium compounds also include, for example, stabilized lithium powders (stabilized lithium metal powder; SLMP® FMC Lithium Energy). Examples of SLMPs® are lithium metal particles which are coated with a lithium salt, in particular lithium oxide, lithium carbonate, lithium hydroxide or lithium phosphate. Such SLMPs® can be produced in a conventional way. Compaction of the electrode, for example by conventional calendering, leads to prelithiation of silicon in the anode. Compacting usually breaks up the passivation layer of the SLMP®, so that the lithium particles can prelithiate the silicon during the course of formation of the battery.

In the prelithiating operation, the prelithiation agents can be applied directly or indirectly to silicon. In direct processes, the prelithiating agents are generally applied directly to silicon, while in indirect processes the prelithiating agents are generally introduced into cathodes or cathode coatings or into silicon-containing anodes or into silicon-containing anode coatings or are added to the electrolyte.

Prelithiating can be carried out by ex-situ or in-situ prelithiation. In in-situ prelithiation, prelithiation is generally carried out after assembly of the cell or during formation of the cell or of the battery. In in-situ processes, prelithiating agents are, for example, introduced into cathodes, sacrificial electrodes or into the electrolyte. The silicon in the anode is generally prelithiated during the course of formation of the battery. Any gases arising can be removed via an evacuation step.

In contrast, ex-situ prelithiation is generally carried out before assembly of the cell or before formation of the cell or of the battery. In ex-situ prelithiation, the anode active material silicon or the silicon-containing anode is prelithiated and subsequently assembled to give a cell. A cell generally comprises an anode and a cathode. A cell can be a full cell or a half cell.

The prelithiating of the anode active material silicon can be carried out by physical, chemical or electrochemical processes.

In physical processes, prelithiation is generally effected by combining, contacting or mixing the starting materials, in particular silicon, with prelithiating agents, in particular lithium compounds such as lithium salts. In physical processes, the prelithiating agents are generally not reacted chemically before the prelithiating operation. Examples of physical processes are spray processes, dipping processes, mixing, coating, thermally induced diffusion, precipitation, vapor phase deposition (PVD), sputtering or other deposition methods. The customary apparatuses or procedures can be employed for this purpose. The prelithiating agents can, for example, be employed as solid, liquid or melt or in the form of solutions or suspensions.

Solvents are, for example, water, alcohols, ethers or esters. Stabilized lithium powders (SLMP®; FMC Lithium Energy) are particularly suitable as lithium compounds for physical processes.

In chemical or electrochemical processes, lithium ions are generally liberated by chemical reaction of prelithiating agents. In this context, the lithium compounds are also referred to as sacrificial salts.

A preferred chemical process is chemical vapor deposition (CVD), in particular for ex-situ processes. In CVD processes, preference is given to using lithiated precursors such as lithium-alkynes or lithiated aromatic hydrocarbons, in particular lithiated acetylene or lithiated toluene. It is possible to employ essentially conventional CVD processes and CVD apparatuses. CVD processes are, for example, carried out at temperatures of from 500 to 800° C., preferably under an inert gas atmosphere such as nitrogen or argon.

In electrochemical prelithiation, lithium compounds which liberate lithium ions and prelithiate the silicon in the anode during formation of the lithium ion battery are introduced into the cathode or into the electrolyte. Preferred lithium compounds for this purpose are lithium peroxides, lithium nitrides, lithium azides, lithium acetates, lithium amines or lithium acetylenes. Formation can, for example, be carried out at voltages of from 3.8 to 5 volt, in particular from 4.2 to 5 volt. Electrochemical prelithiation is preferably employed for in-situ processes.

For the electrochemical prelithiation by in-situ processes, it is also possible, for example, for a silicon-containing electrode and a lithium metal electrode, for example a lithium metal plate, to be connected to one another so that after application of an electrochemical potential lithium is introduced into the silicon. An electrode containing silicon particles is preferably assembled together with a lithium metal counterelectrode, for example in the form of a lithium metal foil, to produce a cell which is subsequently electrically charged with prelithiation of silicon; followed by dismantling of the cell and use of the resulting prelithiated electrode as silicon-containing anode for production of a lithium ion battery. Such a procedure is particularly preferred for prelithiation on the laboratory scale.

In electrochemical prelithiation, the anode is charged with preferably from 800 to 1500 mAh/g, particularly preferably from 900 to 1200 mAh/g, and after complete discharge preferably charged with ≤1500 mAh/g, particularly preferably from 150 to 1000 mAh/g, in each case based on the mass of the anode coating.

Formation preferably does not encompass predoping. Prelithiation generally does not encompass predoping. In predoping of silicon, in particular of silicon containing silicon oxide or silicon suboxide, lithium silicates are usually formed. In contrast, lithium silicides are generally formed in prelithiation.

The lithium ion batteries are generally structured or configured and/or are generally operated in such a way that the material of the anode (anode material), in particular the silicon, is only partially lithiated in the fully charged battery. The expression fully charged refers to the state of the battery in which the anode material of the battery, in particular silicon, has its highest degree of lithiation. Partial lithiation of the anode material means that the lithiation capacity or the maximum lithium update capability of the anode active material, in particular of silicon, is not exhausted.

During the course of cycling or charging and/or discharging of the lithium ion battery with the partial lithiation according to the invention, the ratio of lithium atoms to silicon atoms in the anode material (Li/Si ratio) changes by preferably ≤2.2, particularly preferably ≤1.3 and most preferably ≤0.9. The abovementioned Li/Si ratio preferably changes by ≥0.2, particularly preferably ≥0.4 and most preferably ≥0.6.

The degree of lithiation $\alpha 2$ generally refers to the proportion of the lithiation capacity of silicon which is maximally utilized for cycling of the lithium ion battery. In other words, the degree of lithiation $\alpha 2$ is a measure of the extent to which the lithiation capacity of silicon is maximally utilized for cycling of the battery. The degree of lithiation $\alpha 2$ of silicon is preferably from 5 to 50%, particularly preferably from 10 to 45% and most preferably from 25 to 40%, of the lithiation capacity of silicon. A method for determining the degree of lithiation $\alpha 2$ is described below in the examples.

During the course of cycling of the lithium ion battery, the capacity of the anode material silicon is preferably utilized to an extent of ≤50%, particularly preferably ≤45% and most preferably ≤40%, based on a capacity of 4200 mAh per gram of silicon.

The ratio of lithium atoms to silicon atoms in the anode of a lithium ion battery (Li/Si ratio) can, for example, be set via the electric charge flow during charging and discharging of the lithium ion battery. The degree of lithiation $\alpha 2$ of the anode active material, in particular of silicon, generally changes proportionally to the electric charge which has flowed through. In this variant, the lithiation capacity of the anode active material is generally not fully exhausted during charging of the lithium ion battery and not all the lithium is extracted from the anode active material during discharging of the lithium ion battery. This can, for example, be set by means of appropriate switch-off voltages or, in other words, by limiting the charge flow during charging or discharging of the lithium ion battery. In this way, the total degree of lithiation $\alpha$ and thus also the degree of prelithiation $\alpha 1$ can also be set.

In an alternative, preferred variant, the Li/Si ratio of a lithium ion battery is set via the anode to cathode ratio (cell balancing). Here, the lithium ion batteries are designed so that the lithium uptake capability of the anode is preferably greater than the lithium release capability of the cathode. This leads to the lithium uptake capability of the anode not being fully exhausted in the fully charged battery. In this way, the degree of lithiation $\alpha 2$, the total degree of lithiation $\alpha$ and thus also the degree of prelithiation $\alpha 1$ can be set.

The anode active material is preferably silicon-containing particles, particularly preferably silicon particles.

The volume-weighted particle size distribution of the silicon particles is preferably between the diameter percentiles $d_{10}$≥0.2 μm and $d_{90}$≤20.0 μm, particularly preferably between $d_{10}$≥0.2 μm and $d_{90}$≤10.0 μm and most preferably between $d_{10}$≥0.2 μm and $d_{90}$≤3.0 μm.

The silicon particles have a volume-weighted particle size distribution having diameter percentiles $d_{10}$ of preferably ≤10 μm, particularly preferably ≤5 μm, more preferably ≤3 μm and most preferably ≤1 μm. The silicon particles have a volume-weighted particle size distribution having diameter percentiles $d_{90}$ of preferably ≥0.5 μm. In an embodiment of the present invention, the abovementioned $d_{90}$ is preferably ≥5 μm.

The volume-weighted particle size distribution of the silicon particles has diameter percentiles $d_{50}$ of preferably from 0.5 to 10.0 μm, particularly preferably from 0.6 to 7.0 μm, even more preferably from 2.0 to 6.0 μm and most preferably from 0.7 to 3.0 μm. As an alternative, preference is also given to silicon particles whose volume-weighted particle size distribution has diameter percentiles $d_{50}$ of from 10 to 500 nm, particularly preferably from 20 to 300 nm, even more preferably from 30 to 200 nm and most preferably from 40 to 100 nm.

The volume-weighted particle size distribution of the silicon particles can be determined by static laser light scattering using the Mie model and the measuring instrument Horiba LA 950 using ethanol as dispersion medium for the silicon particles.

The silicon particles are preferably not aggregated, preferably not agglomerated and/or preferably not nanostructured. Aggregated means that a number of spherical or largely spherical primary particles as are initially formed, for example, in the production of silicon particles by means of gas phase processes grow together, melt together or sinter together to form aggregates. Aggregates are thus particles which comprise a plurality of primary particles. Aggregates can form agglomerates. Agglomerates are a loose assembly of aggregates. Agglomerates can typically easily be broken up again into aggregates by kneading or dispersing processes. Aggregates cannot be broken up completely into the primary particles using such methods. Aggregates and agglomerates inevitably have, due to the way in which they are formed, quite different sphericities and particle shapes than the silicon particles according to the invention. The presence of silicon particles in the form of aggregates or agglomerates can, for example, be made visible by means of conventional scanning electron microscopy (SEM). In contrast, static light scattering methods for determining particle size distributions or particle diameters of silicon particles cannot distinguish between aggregates or agglomerates.

Silicon particles which are not nanostructured generally have characteristic BET surface areas. The BET surface areas of the silicon particles are preferably from 0.01 to 30.0 $m^2/g$, more preferably from 0.1 to 25.0 $m^2/g$, particularly preferably from 0.2 to 20.0 $m^2/g$ and most preferably from 0.2 to 18.0 $m^2/g$. The BET surface area is determined in accordance with DIN 66131 (using nitrogen).

The silicon particles have a sphericity of preferably $0.3 \leq \psi \leq 0.9$, particularly preferably from $0.5 \leq \psi \leq 0.85$ and most preferably from $0.65 \leq \psi \leq 0.85$. Silicon particles having such sphericities are obtainable, in particular, by production by means of milling processes. The sphericity w is the ratio of the surface area of a sphere of the same volume to the actual surface area of a body (definition of Wadell). Sphericities can, for example, be determined from conventional SEM images.

Preference is given to polycrystalline silicon particles. The silicon particles are preferably based on elemental silicon. The elemental silicon can be high-purity silicon or silicon from metallurgical processing which can, for example, have elemental contamination such as Fe, Al, Ca, Cu, Zr, C. The silicon particles can optionally be doped with foreign atoms (for example B, P, As). Such foreign atoms are generally present in only a small proportion.

The silicon particles can contain silicon oxide, in particular on the surface of the silicon particles. If the silicon particles contain a silicon oxide, the stoichiometry of the oxide $SiO_x$ is preferably in the range $0<x<1.3$. The layer thickness of silicon oxide on the surface of the silicon particles is preferably less than 10 nm.

The surface of the silicon particles can optionally be covered by an oxide layer or by other inorganic and organic groups. Particularly preferred silicon particles bear Si—OH or Si—H groups or covalently bound organic groups, for example alcohols or alkenes, on the surface.

The silicon particles have a silicon content of ≥90% by weight, preferably ≥95% by weight, particularly preferably 97% by weight and most preferably 99% by weight, based on the total weight of the silicon particles.

The silicon particles can, for example, be produced by milling processes. Possible milling processes are, for example, wet milling processes or preferably dry milling processes, as described, for example, in DE-A 102015215415.

The silicon particles can optionally also be coated with carbon (C-coating Si particles) or be present in the form of silicon/carbon composite particles (Si/C composite particles). The C-coated Si-particles preferably contain from 1 to 10% by weight of carbon and preferably from 90 to 99% by weight of silicon particles, in each case based on the total weight of the C-coated Si particles. In Si/C composite particles, the silicon particles are preferably incorporated into a porous carbon matrix. As an alternative, pores of the porous carbon matrix can be coated with silicon, for example in the form of a silicon film or in the form of silicon particles. The silicon-containing porous carbon matrix is preferably coated with nonporous carbon. The carbon coating of the C-coated Si particles or the Si/C composite particles has an average layer thickness in the range of preferably 1 to 50 nm (method of determination: scanning electron microscopy (SEM)). The C-coated Si particles or the Si/C composite particles have average particle diameters $d_{50}$ of preferably from 1 to 15 μm. The BET surface area of the abovementioned particles is preferably from 0.5 to 5 $m^2/g$ (determination in accordance with DIN ISO 9277: 2003-05 using nitrogen). Further information regarding the C-coated Si particles or the Si/C composite particles and also processes for the production thereof may be found in WO 2018/082880, WO 2017/140642 or WO 2018/145732.

The anode material preferably comprises silicon particles, one or more binders, optionally graphite, optionally one or more further electrically conductive components and optionally one or more additives.

The proportion of silicon in the anode material is preferably from 40 to 95% by weight, particularly preferably from 50 to 90% by weight and most preferably from 60 to 80% by weight, based on the total weight of the anode material.

Preferred binders are polyacrylic acid or alkali metal salts thereof, in particular lithium or sodium salts, polyvinyl alcohols, cellulose or cellulose derivates, polyvinylidene fluoride, polytetrafluoroethylene, polyolefins, polyimides, in particular polyamidimides, or thermoplastic elastomers, in particular ethylene-propylene-diene terpolymers. Particular preference is given to polyacrylic acid, polymethacrylic acid or cellulose derivatives, in particular carboxymethyl cellulose. Particular preference is also given to the alkali metal salts, in particular lithium or sodium salts, of the abovementioned binders. The binders have a molar mass of preferably from 100 000 to 1 000 000 g/mol.

As graphite, it is generally possible to use natural or synthetic graphite. The graphite particles preferably have a volume-weighted particle size distribution between the diameter percentiles $d_{10}≥0.2$ μm and $d_{90}≤200$ μm.

Preferred further electrically conductive components are conductive carbon black, carbon nanotubes or metallic particles, for example copper. Amorphous carbon, in particular hard carbon or soft carbon, is also preferred. Amorphous carbon is, as is known, not graphitic. The anode material preferably contains from 0 to 40% by weight, particularly preferably from 0 to 30% by weight and most preferably from 0 to 20% by weight, of further electrically conductive components, based on the total weight of the anode material.

Examples of anode material additives are pore formers, dispersants, levelling agents or dopants, for example elemental lithium.

Preferred formulations for the anode material of the lithium ion batteries preferably contain from 5 to 95% by weight, in particular from 60 to 85% by weight, of silicon particles; from 0 to 40% by weight, in particular from 0 to 20% by weight, of further electrically conductive components; from 0 to 80% by weight, in particular from 5 to 30% by weight, of graphite; from 0 to 25% by weight, in particular from 1 to 15% by weight, of binders; and optionally from 0 to 80% by weight, in particular from 0.1 to 5% by weight, of additives; where the figures in % by weight are based on the total weight of the anode material and the proportions of all constituents of the anode material add up to 100% by weight.

In a preferred formulation for the anode material, the proportion of graphite particles and further electrically conductive components in total is at least 10% by weight, based on the total weight of the anode material.

The processing of the constituents of the anode material to give an anode ink or paste can, for example, be carried out in a solvent such as water, hexane, toluene, tetrahydrofuran, N-methylpyrrolidone, N-ethylpyrrolidone, acetone, ethyl acetate, dimethyl sulfoxide, dimethylacetamide or ethanol or solvent mixtures, preferably using rotor-stator machines, high-energy mills, planetary kneaders, stirred ball mills, shaking tables or ultrasonic appliances.

The anode ink or paste has a pH of preferably from 2 to 7.5, more preferably ≤7.0 (determined at 20° C., for example using a WTW pH 340i pH meter with SenTix® RJD probe).

The anode ink or paste can, for example, be applied to a copper foil or another current collector, for example as described in WO 2015/117838.

The layer thickness, i.e. the dry layer thickness, of the anode coating is preferably from 2 μm to 500 μm, particularly preferably from 10 μm to 300 μm.

The anodes of the lithium ion batteries generally comprise anode coatings and current collectors. Anode coatings are generally based on anode materials. The procedure according to the invention advantageously also makes anode coatings having high volumetric capacities possible. The anode coatings preferably have a volumetric capacity of ≥660 $mAh/cm^3$. The volumetric capacity of the anode coatings can be determined by dividing the delithiation capacity β per unit area, as described below, by the thickness of the anode coating. The thickness of the anode coating can be determined using the Mitutoyo digital gauge (1 μm to 12.7 mm) with fine measurement table.

The cathode preferably comprises lithium cobalt oxide, lithium nickel oxide, lithium nickel cobalt oxide (doped or undoped), lithium manganese oxide (spinel), lithium nickel cobalt manganese oxides, lithium nickel manganese oxides, lithium iron phosphate, lithium cobalt phosphate, lithium manganese phosphate, lithium vanadium phosphate or lithium vanadium oxides as cathode materials.

The separator is generally an electrically insulating membrane which is permeable to ions, as is customary in battery production. As is known, the separator separates the anode from the cathode and thus prevents electronically conductive connections between the electrodes (short circuit).

The electrode is usually a solution of a lithium salt (=electrolyte salt) in an aprotic solvent. Examples of electrolyte salts are lithium hexafluorophosphate, lithium hexafluoroarsenate, lithium perchlorate, lithium tetrafluoroborate, $LiCF_3SO_3$, $LiN(CF_3SO_2)$ or lithium borates. The concentration of the electrolyte salt, based on the solvent, is preferably in the range from 0.5 mol/1 to the solubility limit of the respective salt. It is particularly preferably from 0.8 mol/1 to 1.2 mol/1.

As solvents, it is possible to use cyclic carbonates, propylene carbonate, ethylene carbonate, fluoroethylene carbonate, dimethyl carbonate, diethyl carbonate, ethyl methyl carbonate, dimethoxyethane, diethoxyethane, tetrahydrofuran, 2-methyltetrahydrofuran, gamma-butyrolactone, dioxolane, acetonitrile, organic carbonic esters or nitriles, individually or as mixtures thereof.

The electrolyte preferably contains a film former such as vinylene carbonate or fluoroethylene carbonate. The proportion of the film former in the electrolyte is preferably from 0.1% by weight to 20.0% by weight, particularly preferably from 0.5% by weight to 10% by weight.

All substances and materials utilized for producing the lithium ion battery of the invention as described above are known. The production of the parts of the battery of the invention and the assembly thereof to give the battery of the invention are carried out by the methods known in the field of battery production.

Surprisingly, the total cell capacity of the lithium ion battery and the stability of the lithium ion battery during cycling are increased by the procedure according to the invention and fading and the continuous losses during cycling are thus significantly reduced. In addition, the lithium ion batteries of the invention have high initial capacities. For all these effects to be realized, the prelithiation according to the invention and also the partial lithiation according to the invention act synergistically. A critical factor here is that the lithiation has been carried out to the extent according to the invention. Lithiation which is too high or too low has been found to be counterproductive.

The following examples serve to illustrate the invention:

Experimental determination of the total degree of lithiation $\alpha$:

The degree of lithiation $\alpha$ of the active material can be determined with the aid of the formula I below:

$$\alpha = \frac{\beta}{\gamma \cdot FG \cdot \omega_{AM}}, \quad (I)$$

where

- $\beta$: delithiation capacity per unit area of the active material-containing anode at the respective charging end voltage of the lithium ion battery which has been delithiated in a half cell measurement against lithium;
- $\gamma$: maximum capacity of the active materials for lithium (in the case of silicon at a stoichiometry of $Li_{4.4}Si$ corresponds to 4200 mAh/g)
- FG: weight per unit area of the anode coating in $g/cm^2$;
- $\omega_{AM}$: percentage by weight of active material in the anode coating.

Experimental Determination of the Delithiation Capacity Per Unit Area $\beta$:

The lithium ion battery is brought into the electrically charged state by charging by the cc method (constant current) at a constant current of 5 mA/g (corresponds to C/25) up to attainment of the respective charging end voltage, in particular the voltage limit of 4.2 V. Here, the anode is lithiated. The lithium ion battery which has been charged in this way is open, the anode is taken out and is used to make up a button half cell (type CR2032, Hohsen Corp.) with lithium counterelectrode (Rockwood Lithium, thickness 0.5 mm, diameter=15 mm). A glass fiber filter paper (Whatman™, GD Type D) impregnated with 120 μl of electrolyte can serve as separator (diameter=16 mm). As electrolyte, use is made of a 1.0 molar solution of lithiumhexafluorophosphate in a 3:7 (v/v) mixture of fluoroethylene carbonate and ethyl methyl carbonate which is admixed with 2.0% by weight of vinylene carbonate. The cell is generally constructed in a glove box (<1 ppm of $H_2O$ and $O_2$). The water content of the dry mass of all starting materials is preferably below 20 ppm. The delithiation capacity per unit area $\beta$ of the active material-containing anode coating is determined by charging the button half cell produced in this way (working electrode=positive electrode=active material anode; counterelectrode=anode=lithium) at C/25 up to attainment of the voltage limit of 1.5 V. Here, the Si anode is delithiated. The electrochemical measurements on full cell and half cell are carried out at 20° C. The abovementioned constant current is based on the weight of the coating of the positive electrode.

Experimental Determination of the Degree of Prelithiation $\alpha1$:

The lithium ion battery is brought into the electrically uncharged state by being discharged by the cc method (constant current) at a constant current of 5 mA/g (corresponds to C/25) up to attainment of the respective discharging end voltage, in particular the voltage limit of 3.0 V. Here, the anode is delithiated. The lithium ion battery which has been discharged in this way is opened, the anode is taken out and used to make up a button half cell (type CR2032, Hohsen Corp.) with lithium counterelectrode (Rockwood Lithium, thickness 0.5 mm, diameter=15 mm). A glass fiber filter paper (Whatman™, GD Type D) impregnated with 120 μl of electrolyte can serve as separator (diameter=16 mm). A 1.0 molar solution of lithium hexafluorophosphate in a 3:7 (v/v) mixture of fluoroethylene carbonate and ethyl methyl carbonate admixed with 2.0% by weight of vinylene carbonate is used as electrolyte. The cell is generally constructed in a glove box (<1 ppm of $H_2O$ and 02). The water content of the dry mass of all starting materials is preferably below 20 ppm. The degree of prelithiation $\alpha1$ brought about by the prelithiation is determined by charging the button half cell produced in this way (working electrode=positive electrode=active material anode; counterelectrode=anode=lithium) at C/25 up to attainment of the voltage limit of 1.5 V. Here, the Si anode is delithiated further. The electrochemical measurements on full cell and half cell are carried out at 20° C. The abovementioned constant current is based on the weight of the coating of the positive electrode.

The degree of prelithiation α1 is then calculated using the formula II below:

$$\alpha_1 = \frac{\delta}{\gamma \cdot FG \cdot \omega_{AM}}, \quad (II)$$

where

- δ: delithiation capacity per unit area of the active material-containing anode at the respective discharging end voltage of the lithium ion battery which has been delithiated further in a half cell measurement against lithium;
- γ: maximum capacity of the active material for lithium (in the case of silicon at a stoichiometry of $Li_{4.4}Si$, corresponds to 4200 mAh/g)
- FG: weight per unit area of the anode coating in $g/cm^2$;
- $\omega_{AM}$: percentage by weight of active material in the anode coating.

Determination of the Degree of Lithiation α2:

The degree of lithiation α2 is calculated as the difference between the total degree of lithiation α and the degree of prelithiation α1, as also illustrated with the aid of the following formula:

Degree of lithiation α2=(total degree of lithiation α)−(degree of prelithiation α1).

EXAMPLE 1

Production of Unaggregated, Splinter-Shaped Silicon Particles by Milling:

The silicon powder was produced according to the prior art by milling of coarse crushed Si from the production of solar silicon in a fluidized-bed jet mill (Netzsch-Condux CGS16 using 90 $m^3$/h of nitrogen at 7 bar as milling gas).

The resulting product consisted of individual, unaggregated, splinter-shaped particles (SEM) and had a particle size distribution $d_{10}$=2.23 μm, $d_{50}$=4.48 μm and $d_{90}$=7.78 μm and also a width (d90–d10) of 5.5 μm (determined by means of static laser light scattering, measurement instrument Horiba LA 950, using the Mie model in a greatly diluted suspension in ethanol).

EXAMPLE 2

Anode Comprising the Silicon Particles from Example 1:

29.709 g of polyacrylic acid (Sigma-Aldrich, Mw 450 000 g/mol) dried to constant weight at 85° C. and 751.60 g of deionized water were agitated by means of a shaker (290 l/min) for 2.5 h until complete dissolution of the polyacrylic acid. Lithium hydroxide monohydrate (Sigma-Aldrich) was added a little at a time to the solution until the pH was 7.0 (measured using WTW pH 340i PH meter and SenTix® RJD) electrode. The solution was subsequently mixed by means of a shaker for a further 4 hours.

7.00 g of the silicon particles from Example 1 were then dispersed in 12.50 g of the neutralized polyacrylic acid solution (concentration 4% by weight) and 5.10 g of deionized water by means of a high-speed mixer at a circumferential velocity of 4.5 m/s for 5 minutes and of 12 m/s for 30 minutes while cooling at 20° C. After addition of 2.50 g of graphite (Imerys, KS6L C-NERGY™), the mixture was then stirred for a further 30 minutes at a circumferential velocity of 12 m/s. After degassing, the dispersion was applied to a copper foil having a thickness of 0.030 mm (Schlenk Metallfolien, SE-Cu58™) by means of a film drawing frame having a gap height of 0.10 mm (Erichsen, model 360). The anode coating produced in this way was subsequently dried for 60 minutes at 80° C. and 1 bar atmospheric pressure.

The anode coating dried in this way had an average weight per unit area of 2.85 $mg/cm^2$ and a layer thickness of 32 μm.

EXAMPLE 3

Prelithiation of the Anode from Example 2:

The electrochemical prelithiation was carried out in a button cell (type CR2032, Hohsen Corp.) in a two-electrode arrangement. The electrode coating from Example 2 was used as working electrode or positive electrode (diameter=15 mm) and Li foil having a thickness of 0.5 mm was used as counterelectrode or negative electrode (diameter=15 mm). A glass fiber filter paper (Whatman™, GD Type D) impregnated with 120 μl of electrolyte served as separator (diameter=16 mm). The electrolyte used consisted of a 1.0 molar solution of lithiumhexafluorophosphate in a 3:7 (v/v) mixture of fluoroethylene carbonate and ethyl methyl carbonate admixed with 2.0% by weight of vinylene carbonate. The cell was constructed in a glove box (<1 ppm $H_2O$, $O_2$), and the water content in the dry mass of all components used was below 20 ppm.

The prelithiation was carried out by lithiating the anode from Example 2 at 20° C. using a constant current of 33.6 mA/g or 0.10 $mA/cm^2$ (corresponds to C/25) for 31.25 hours and a constant current of 33.6 mA/g or 0.10 $mA/cm^2$ up to attainment of the voltage limit of 1.0 V and then prelithiated at a constant current of 33.6 mA/g or 0.10 $mA/cm^2$ for 12.5 hours (corresponds to 420 mAh/g). The specific current selected was based on the weight of the anode coating.

The details for formation and also the degrees of lithiation α, α1 and α2 are summarized in Table 1.

EXAMPLE 4 (EX. 4)

The electrochemical tests were carried out on a button cell (type CR2032, Hohsen Corp.) in a two-electrode arrangement. The prelithiated electrode coating from Example 3 was used as counterelectrode or negative electrode (diameter=15 mm), and a coating based on lithium nickel manganese cobalt oxide 6:2:2 having a content of 94.0% and an average weight per unit area of 14.5 $mg/cm^2$ (procured from Custom Cells) was used as working electrode or positive electrode (diameter=15 mm). A glass fiber filter paper (Whatman™, GD Type D) impregnated with 120 μl of electrolyte served as separator (diameter=16 mm). The electrolyte used consisted of a 1.0 molar solution of lithium hexafluorophosphate in a 3:7 (v/v) mixture of fluoroethylene carbonate and ethyl methyl carbonate admixed with 2.0% by weight of vinylene carbonate. The cell was again constructed in a glove box (<1 ppm $H_2O$, O2), and the water content in the dry mass of all components used was below 20 ppm.

Electrochemical testing was carried out at 20° C. Charging of the cell was carried out by the cc/cv method (constant current/constant voltage) at a constant current of 75 mA/g (corresponds to C/2) and after attainment of the voltage limit of 4.2 V at a constant voltage until the current went below 19 mA/g (corresponds to C/8). Discharging of the cell was carried out by the cc method (constant current) at a constant current of 75 mA/g (corresponds to C/2) in subsequent cycles up to attainment of the voltage limit of 3.0 V. The specific current selected was based on the weight of the coating of the positive electrode.

On the basis of the anode formulation from Examples 2 and 3, the lithium ion battery was operated in combination with the cathode from Example 4 by the cell balancing set with partial lithiation of the anode.

In the first cycle (C/2), a reversible capacity of 2.24 mAh/cm$^2$ was achieved.

After 250 charging/discharging cycles, the cell still had 89% of its initial capacity from the first cycle.

The test results are summarized in Table 2.

COMPARATIVE EXAMPLE 5 (CEx. 5)

The procedure of Example 4 was repeated, except that the anode was not prelithiated.

On the basis of the cell balancing resulting from the anode formulation of Example 2 and the cell balancing of Example 4, the Si anode was operated with partial lithiation.

In the first cycle (C/2), a reversible capacity of only 2.05 mAh/cm$^2$ was observed.

After 250 charging/discharging cycles, the cell had only 75% of its capacity from the first cycle.

The details for formation and the degrees of lithiation α, α1 and α2 are summarized in Table 1, and the test results may also be found in Table 2.

EXAMPLE 6 (EX. 6)

The procedure of Example 4 was repeated, except that the anode was prelithiated at 252 mAh/g.

In the first cycle (C/2), a reversible capacity of 2.22 mAh/cm$^2$ was achieved.

After 250 charging/discharging cycles, the cell still had 83% of its initial capacity from the first cycle.

The details for formation and the degrees of lithiation α, α1 and α2 are summarized in Table 1, and the test results may also be found in Table 2.

TABLE 1

Details for formation and also for the degrees of lithiation α, α1 and α2 for (comparative) examples 4~6:

| | Formation | | Degree of lithiation | | |
|---|---|---|---|---|---|
| | C/25 | C/25 | | | |
| | [mAh/cm$^2$] | [mAh/g] | α | α1 | α2 |
| Ex. 4 | 2.39 | 839 | 0.43 | 0.14 | 0.29 |
| CEx. 5 | 2.20 | 772 | 0.26 | 0.00 | 0.26 |
| Ex. 6 | 2.37 | 832 | 0.37 | 0.09 | 0.28 |

COMPARATIVE EXAMPLE 7 (CEx. 7)

The procedure of Example 4 (prelithiation at 420 mAh/g; α1=0.14) was repeated, except that the partial lithiation was carried out with a degree of lithiation α2=0.85.

The total degree of lithiation α was 0.99.

The initial capacity was 3.37 mAh/cm$^2$.

However, the capacity had dropped to 80% of the initial capacity after only four cycles.

TABLE 2

Results of the electrochemical tests using the (comparative) examples 4~6:

| | initial capacity [mAh/cm$^2$] | volumetric capacity [mAh/cm$^3$] | capacity retention after 250 cycles [%] |
|---|---|---|---|
| Ex. 4 | 2.24 | 700 | 89 |
| CEx. 5 | 2.05 | 632 | 75 |
| Ex. 6 | 2.22 | 680 | 83 |

COMPARATIVE EXAMPLE 8 (CEx. 8)

The procedure of comparative example 7 (degree of lithiation of the partial lithiation: α2=0.85) was repeated, except that the anode was not prelithiated.

The total degree of lithiation α was 0.85.

The initial capacity was 2.80 mAh/cm$^2$.

However, the capacity had dropped to 80% of the initial capacity after only four cycles.

Compared to the batteries of the comparative examples, the batteries of the examples according to the invention surprisingly display a more stable electrochemical cycling behavior and also a high initial capacity.

The comparative examples show that when a procedure which is not according to the invention is employed, increased stressing of the Si-containing anode active material occurs, for example as a consequence of electrochemical milling or increased volume breathing of silicon. This results in electric decontacting and an impaired cycle behavior of the anode active material.

To achieve the advantageous effects according to the invention, it has been found to be essential to select the range according to the invention for the total degree of lithiation α, as comparison of the examples and the comparative examples shows.

The invention claimed is:

1. A method for cycling lithium ion batteries, comprising:

providing a lithium ion battery comprising a cathode, an anode, a separator and an electrolyte, wherein the anode contains prelithiated silicon having a degree of prelithiation α1 of from 5 to 50% and the anode is only partially lithiated during full charging of the lithium ion battery by a lithiation capacity of silicon being utilized to a degree of lithiation α2 of from 5 to 50% by the partial lithiation of the anode during the full charging of the lithium ion battery, wherein a total degree of lithiation α of the silicon is from 10 to 75%, wherein the total degree of lithiation α is a sum of the degree of prelithiation α1 and the degree of lithiation α2, where figures in % are based on a maximum lithiation capacity of silicon; wherein the degree of prelithiation α1 of silicon refers to lithiation of silicon before or during formation of the lithium ion battery and before cycling the lithium ion battery; and wherein the degree of lithiation α2 refers to the proportion of the lithiation capacity of silicon which is occupied as a result of the partial lithiation of the anode during charging when the cycling of the lithium ion battery occurs.

2. The method of claim 1, wherein the anode provided is a final or complete anode for use within the lithium ion battery.

3. The method of claim 1, wherein the silicon comprises silicon particles; and wherein a volume-weighted particle size distribution of the silicon particles has diameter percentiles $d_{50}$ of 0.5 to 10.0 μm.

4. The method of claim 1, wherein the silicon comprises silicon particles; and wherein the silicon particles are not aggregated.

5. The method of claim 1, wherein the silicon comprises silicon particles and wherein a volume-weighted particle size distribution of the silicon particles has diameter percentiles $d_{50}$ of 2.0 to 10.0 μm.

6. The method of claim 1, wherein the prelithiated silicon is obtained by prelithiation of silicon after assembly of the anode or during the formation of the lithium ion battery.

7. The method of claim 1, wherein the total degree of lithiation α of the silicon is from 20 to 60%, based on the maximum lithiation capacity of silicon.

8. The method of claim 1, wherein a ratio of lithium atoms to silicon atoms corresponds to the formula $Li_{0.90}Si$ to $Li_{2.90}Si$ in the partially lithiated anode of the lithium ion battery when fully charged.

9. The method of claim 1, wherein a capacity of silicon is utilized to an extent of from 850 to 2700 mAh per gram of silicon in the partially lithiated anode of a fully charged lithium ion battery.

10. The method of claim 1, wherein 50 to 90% of the total degree of lithiation α are utilized for the cycling of the lithium ion battery.

11. The method of claim 1, wherein from 7 to 46% of the maximum lithiation capacity of silicon is occupied by prelithiation of silicon.

12. The method of claim 1, wherein an amount of lithium introduced into the silicon by prelithiation corresponds to the formula $Li_{0.25}Si$ to $Li_{1.80}Si$.

13. The method of claim 1, wherein an amount of lithium introduced into the silicon by prelithiation corresponds to a lithiation capacity of from 250 to 1700 mAh per gram of silicon.

14. The method of claim 13, wherein a ratio of lithium atoms to silicon atoms in the anode changes by from 0.4 to 1.3 during the cycling of the lithium ion battery.

15. The method of claim 13, wherein from 10 to 45% of the lithiation capacity of silicon is utilized for the cycling of the lithium ion battery.

16. The method of claim 13, wherein from 50 to 90% of the total degree of lithiation α is utilized for the cycling of the lithium ion battery.

* * * * *